United States Patent [19]
Hale et al.

[11] 3,848,203
[45] Nov. 12, 1974

[54] TEA LASER

[76] Inventors: Martin M. Hale, 20 Pere Jogues, Loretteville; Kenneth A. Laurie, 1035 Blvd. Pie XII, Apt. 108, Ste. Foy, Quebec, both of Canada

[22] Filed: Nov. 3, 1972

[21] Appl. No.: 303,344

[52] U.S. Cl. ............................................. 331/94.5
[51] Int. Cl. ............................................. H01s 3/09
[58] Field of Search ...................... 331/94.5; 330/4.3

[56] References Cited
OTHER PUBLICATIONS
Laurie, Folded-Path Atmospheric-Pressure $CO_2$ Laser. IEEE J. Quant. Electr., QE-6, No. 8 (Aug. 1970) pp. 530-532.

*Primary Examiner*—William L. Sikes
*Attorney, Agent, or Firm*—Cushman, Darby & Cushman

[57] ABSTRACT

A TEA gas laser operated by condenser discharge of substantially more than 30 kilovolts directly across a multiplicity of pin electrodes and opposing electrode means to increase uniformity of the shower discharges therebetween and drastically reduce bright arc occurrences while exciting a greater volume of gas per pin and allowing a pin current of up to 10 amperes per pin. In a gas mixture of at least carbon dioxide and helium, less helium is required to sustain the shower discharges, providing for a greater carbon dioxide concentration, all of which results in greater energy output possibilities and greater efficiency possibilities in excess of 2 joules and over 11 percent respectively.

11 Claims, 5 Drawing Figures

TEA LASER

This invention relates to molecular gas lasers and in particular to such lasers in which the pressure of the gas mixture therein is at substantially one atmosphere or 760 Torr and is excited transversely of the optical axis.

Because they feature transverse excitation at atmospheric pressure, the acronym "TEA" has been applied to such lasers. Polyatomic (as opposed to diatomic) gases have generally been used in TEA lasers, and carbon dioxide has especially received much attention as the lasing gas because of its well known advantages. For reasons well known in the art, nitrogen and helium are usually mixed with the carbon dioxide.

The attainment of 10.6 $\mu$m pulses from a discharge at atmospheric pressure by transverse excitation of such mixture was first reported by A. J. Beaulieu in "Transversely Excited Atmospheric Pressure $CO_2$ Lasers," Applied Physics Letter, vol. 16, June 15, 1970, pp. 504–505, which is also described in his U.S. application Ser. No. 731,693, filed May 21, 1968, and his continuation-in-part application Ser. No. 159,209, filed June 30, 1971, the contents of both of those documents being incorporated hereinto by reference and both being assigned to the same assignee as the present application.

A major problem in TEA lasers is to distribute the excitation throughout the cavity volume of the laser. Beaulieu solved this problem in one embodiment by using longitudinally of the laser cavity a series of point electrodes resistively loaded with respective series resistors to distribute the current equally and produce spark discharges from each point electrode transversely of the optical axis to an opposite electrode structure. While Beaulieu originally attained these discharges as sparks, it was later observed by Laurie and Hale in "Folded Path Atmospheric-Pressure $CO_2$ Laser," IEEE Journal of Quantum Electronics (correspondence), vol. QE-6, August 1970, pp. 530–532 that the Beaulieu discharges could take the form of showers rather than sparks when using their circuit and operating parameters. That is, each discharge of their new laser was found to be a cone having many, somewhat diffuse paths originating at each pointed cathode and terminating about the cylindrical surface of the anode. The cone was very non uniform throughout its volume.

Like Beaulieu, D. C. Johnson achieved similar discharges upon replacing the above mentioned series resistors with respective capacitors as reported by Johnson in "Excitation of an Atmospheric-Pressure $CO_2$—$N_2$—He Laser by Capacitor Discharges" IEEE Journal of Quantum Electronics, vol. QE-7, May 1971, pp. 185–189, the subject matter of which is also described in the commonly assigned U.S. application serial No. 65,477, filed Aug. 20, 1970, the contents of the Johnson article and application as well as the above Laurie and Hale article being incorporated hereinto by reference.

Another major problem in TEA lasers is to prevent such sparks or showers from breaking down or degeneratively forming into a bright arc at any point, i.e., to prevent the current in the discharge paths from growing unequally and one of them eventually becoming sufficiently conductive to cause a voltage drop at the electrodes extinguishing the discharge in the other paths. If this is not prevented, it leads to a concentration of the electric current to form a single bright arc which then conducts all the electric current between the electrodes. The onset of a single arc does not provide uniform excitation of the laser medium, and laser action is either prevented or substantially so, for example a drastic decrease in the 10.6 $\mu$m energy in a $CO_2$ TEA laser coincides with the occurrence of a bright arc.

As reported in the above mentioned Laurie and Hale article, they achieved laser action in a TEA laser, without either resistively or capacitively loading the pin electrodes, by exciting the $CO_2$—$N_2$—He mixture with a shorter electrical pulse for example 0.5 microsecond, instead of the longer pulse (1 microsecond) used by Beaulieu and Johnson. When the laser was operated at 30 kilovolts (kv), the shower discharges still appeared as cones of many, somewhat diffuse paths, non uniform throughout, though a greater gas volume was excited, achieving greater efficiencies, for example in the area of 4 to 5 percent, than reported by Beaulieu or Johnson for the same electrode separation.

It is an object of the present invention to significantly improve the efficiency still more, for example up to at least 15 percent, which heretofore was unheard of in pulsed TEA $CO_2$ lasers though available in CW $CO_2$ lasers.

It is also an object of this invention to make the shower discharges in a TEA laser very uniform by operating the laser above 30 kv, preferably in the range of from about 40 kv to at least 60 kv.

Other objects are to excite still larger volumes of gas per pin in a TEA laser and achieve significantly greater current per pin electrode without causing a bright arc, for example 10 A/pin, to cause significantly less helium concentration to be required to sustain the discharges without bright arcs in the excited $CO_2$—$N_2$—He mixture, and to provide for pulse energies in excess of 2 Joules and peak powers in excess of 20 MW.

The objects and advantages and still others will become apparent as achieved by this invention which is at least partially described in the Laurie and Hale article "A Pin-Electrode Atmospheric-Pressure $CO_2$ Laser," IEEE Journal Quantum Electronics, vol. QE-7, No. 11, November 1971, which is incorporated hereinto by reference.

The invention is described and claimed in detail below following this brief description of the drawings in which:

DETAILED DESCRIPTION

Figure 1:
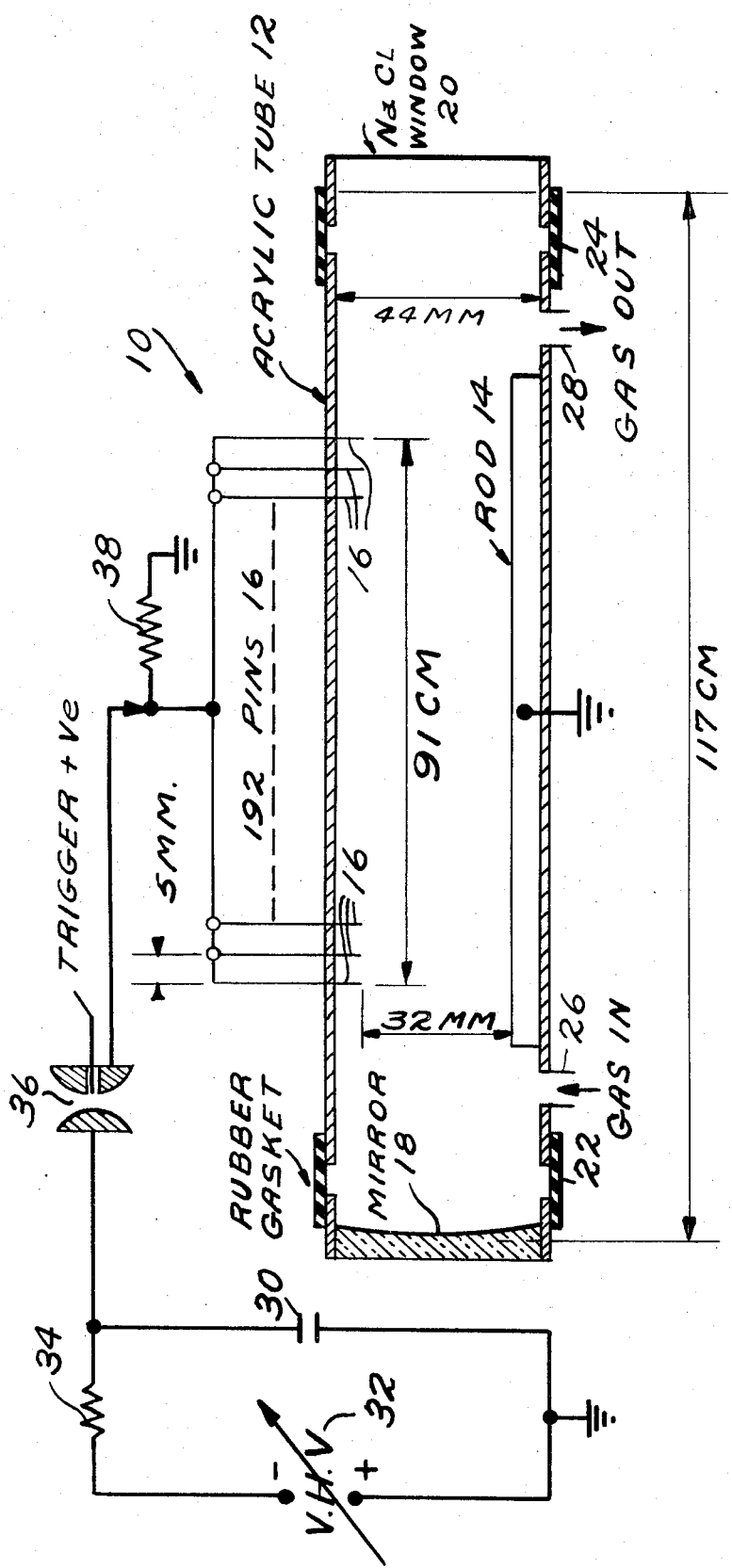
FIG. 1 shows a schematic and diagramatic exemplary arrangement of the invention.

Laser 10 in FIG. 1 is constructed using an acrylic tube 12 into which a semi-circular cross-section copper or brass rod 14 (anode) of 13 mm diameter is inserted, and through which 192 1.0 mm diameter nickel-plated steel pins 16, spaced 5 mm apart in a straight row, are inserted transverse to the axes of the tube and directly opposite the center of the round portion of the rod; the laser axis coincides with the longitudinal axis of the tube. The laser cavity includes a brass mirror 18 at one end and a selenium coated NaCl partially reflecting output window 20 at the other end. Sleeving such as rubber gaskets 22 and 24 connect the mirror 18 and window 20 respectively to tube 12 at opposite ends and act as acoustical isolators. The $CO_2$—$N_2$—He gas mixture passes through the tube from inlet 26 to outlet 28 at a pressure slightly above atmospheric, sufficient to prevent contamination by backstreaming of air.

The dimensions shown in FIG. 1 are exemplary for the invention and may be varied for example as indicated in both of the above mentioned Laurie and Hale articles.

The gas is excited by a capacitor 30 charged from a variable, very high voltage DC power supply 32 through a charging resistor 34. A triggered spark gap 36 of known type (e.g. Type GP 14B from EG & G, Inc) transfers the energy from the storage capacitor 30 to the laser electrodes 14 and 16, pins 16 being negative, at a repetition frequency of 1 pulse per second. Resistor 38 is a bleeder resistor, for example of 300 megohms, and ensures that the system is at ground potential before each trigger of the spark gap. Resistor 38 is typically an order of magnitude higher than resistor 34.

During measurements described below a 0.11 $\mu f$ capacitor 30 was used and the energy of the laser pulse was measured using a joule meter of the type in the Lachambre U.S. Pat. No. 3,660,661 and as described in "A Pyroelectric Energy Meter," Rev. Sci. Inst. vol. 42, Jan. 1971, pp. 74–77. A photon drag detector as described by Gibson, Kimmitt and Walker "Photon Drag in Germanium," Applied Physics Letter, vol. 17, July 15, 1970, pp. 75–77 was used to measure peak power, using $CaF_2$ attenuators above one megawatt to ensure linear operation of the photon drag detector.

OBSERVATIONS

When the laser was operated at 30 kV, shower-type discharges similar to those first described by Laurie and Hale were observed. The showers appeared as cones of many somewhat diffuse paths, non uniform throughout. As the voltage was raised to about 45 kV the appearance of the discharges changed until the individual showers became very uniform. Above 45 kV there was no noticeable improvement.

The shapes of the electrical pulses (voltage and current) above 45 kV were similar to those at 30 kV, differing only in amplitude. The pulses were well damped with no obvious ringing. The current risetimes were 100 ns to 150 ns maximum and the pulse width (FWHM) was 300 ns. The peak current was 2 A/Pin at 30 kV and 10 A/Pin at 50 kV.

Figure 2:
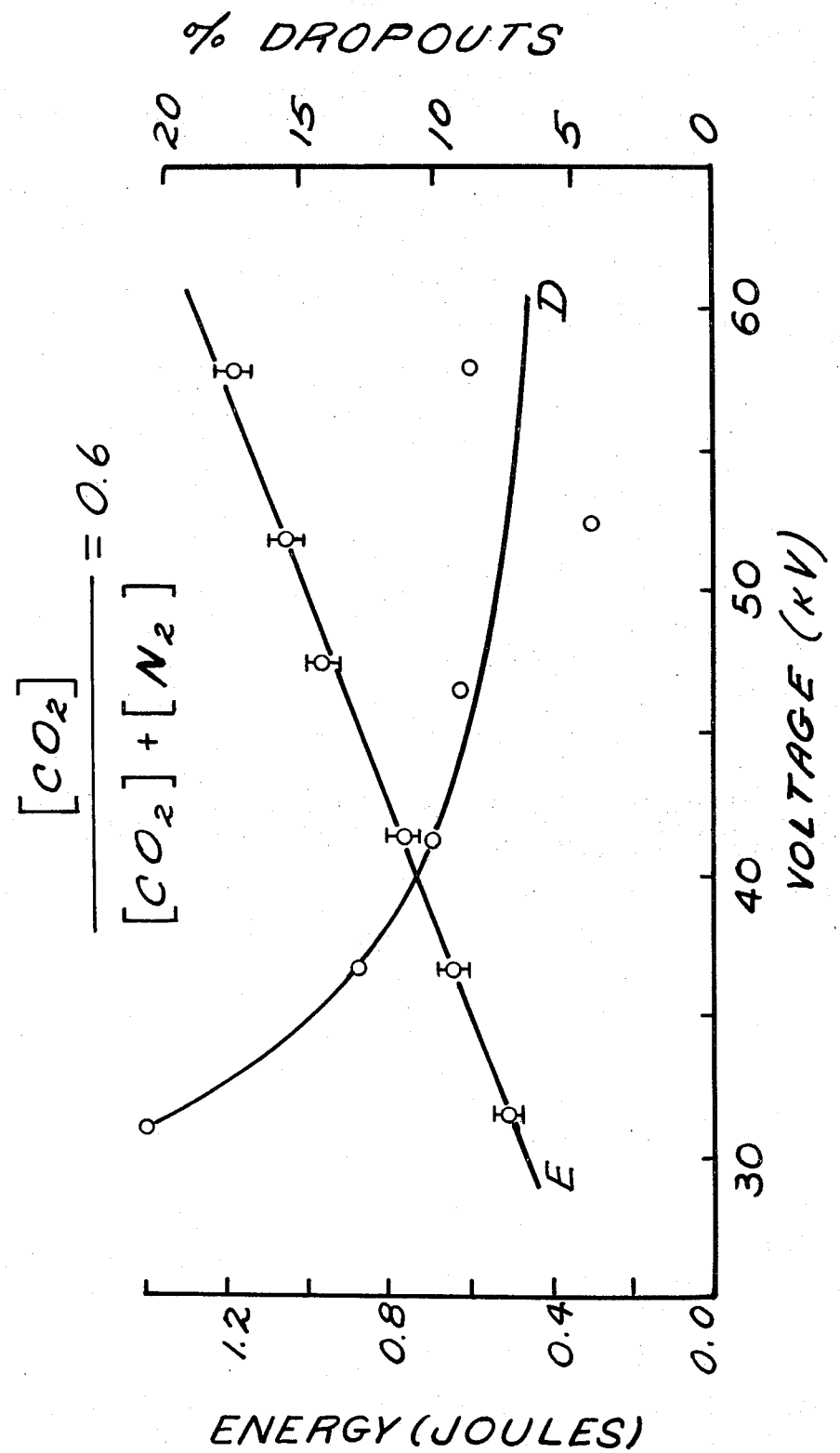
FIG. 2 shows a graph of typical output energy and dropouts versus voltage.

Regarding the following discussions, the graphs in FIGS. 2–5 are based upon these parameters:

FIG. 2: radius of curvature mirror 18, 2.5 m; gas flow 16 liters/min; reflectivity of window 20, 85 percent; percentage $CO_2$:$N_2$:He = 7.5: 4.9: 87.5 by vol.

Figure 3:
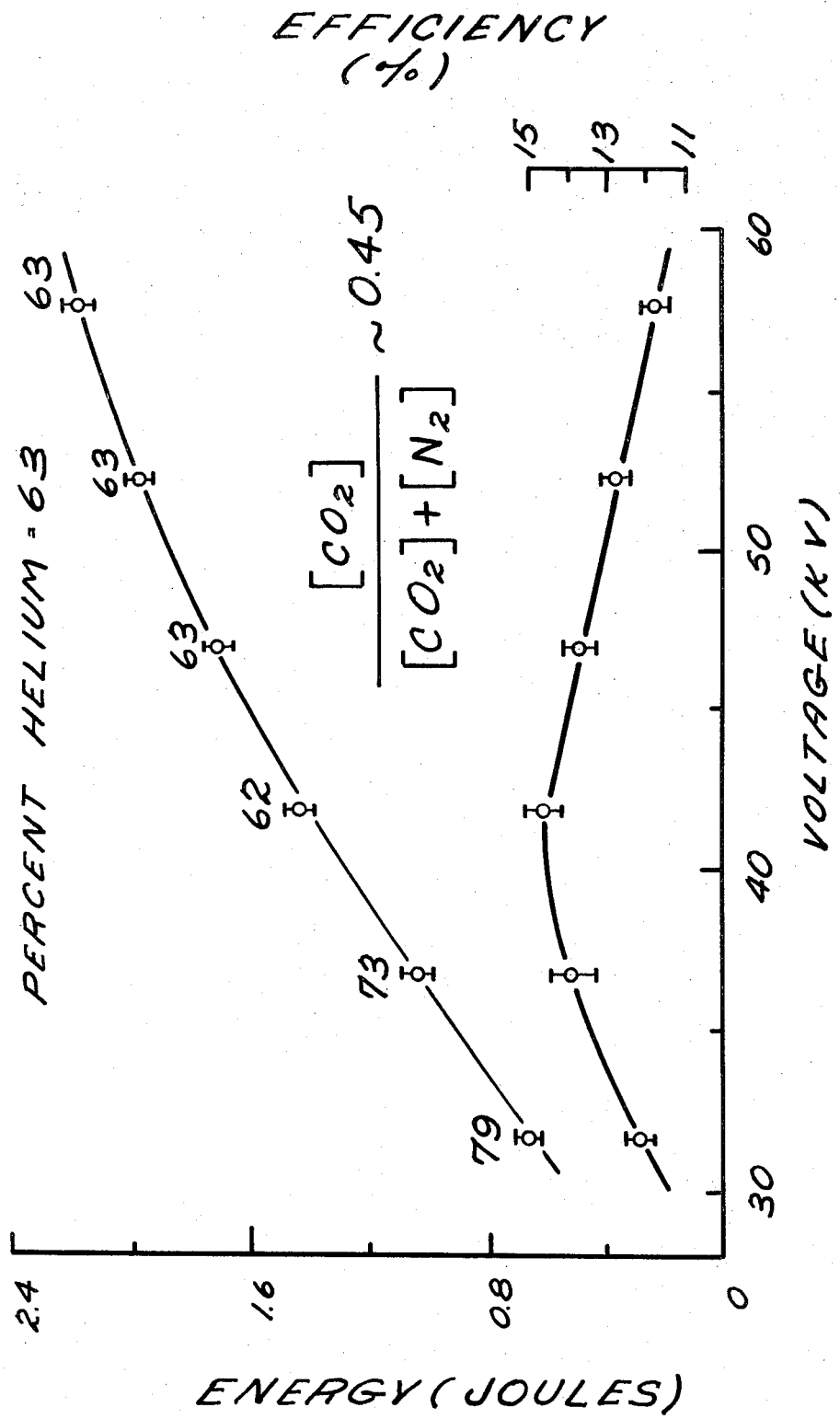
FIG. 3 shows a graph of maximum output energy and efficiency versus voltage.

FIG. 3: radius of curvature mirror 18, 10m, reflectivity of window 20, 65 percent.

Figure 4:
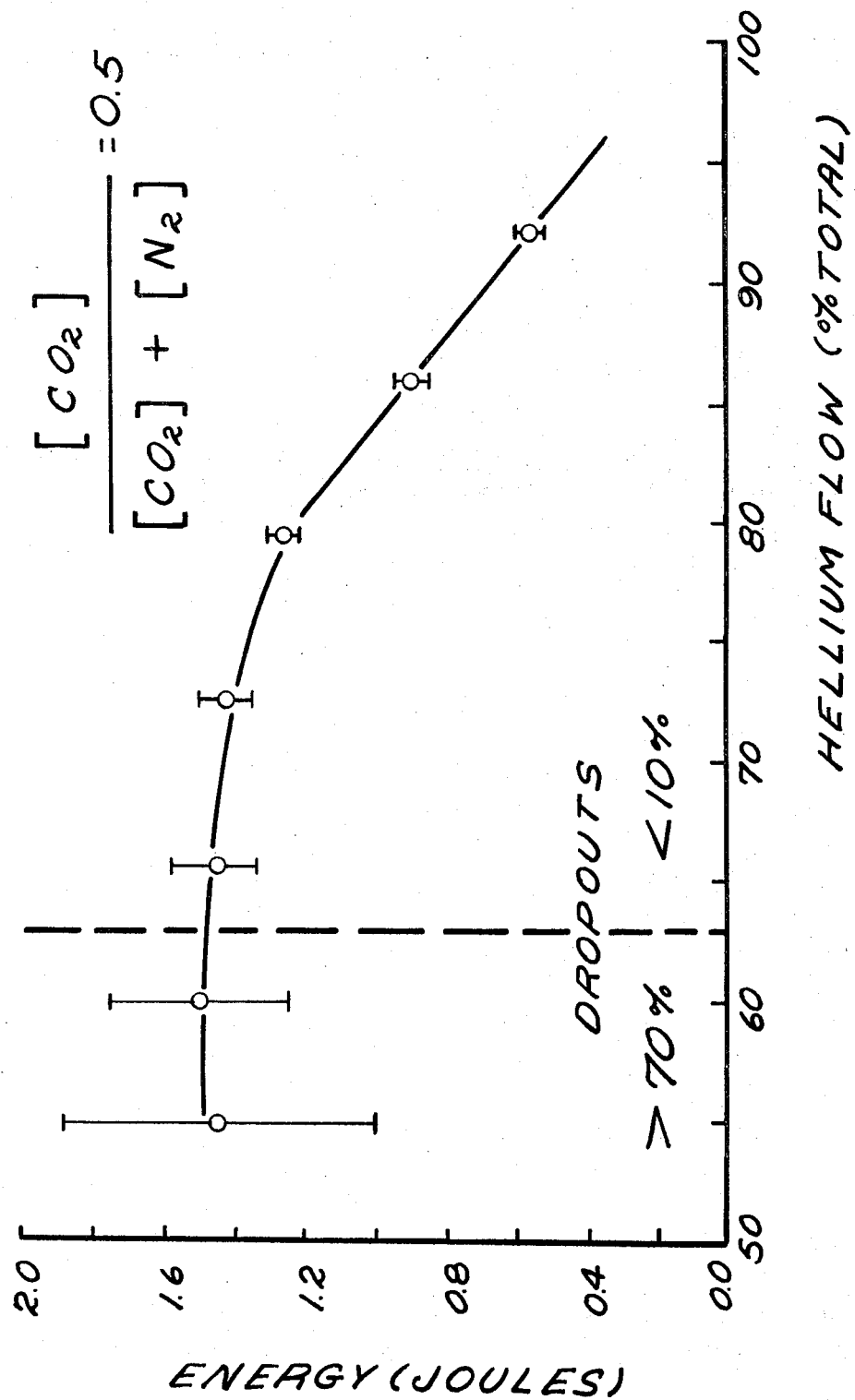
FIG. 4 shows a graph of typical output energy versus helium percentage.

FIG. 4: radius of curvature mirror 18, 10m, gas flow 13 liters/min, reflectivity of window 20, 65 percent, 52 kV from storage capacitor 30.

Figure 5:
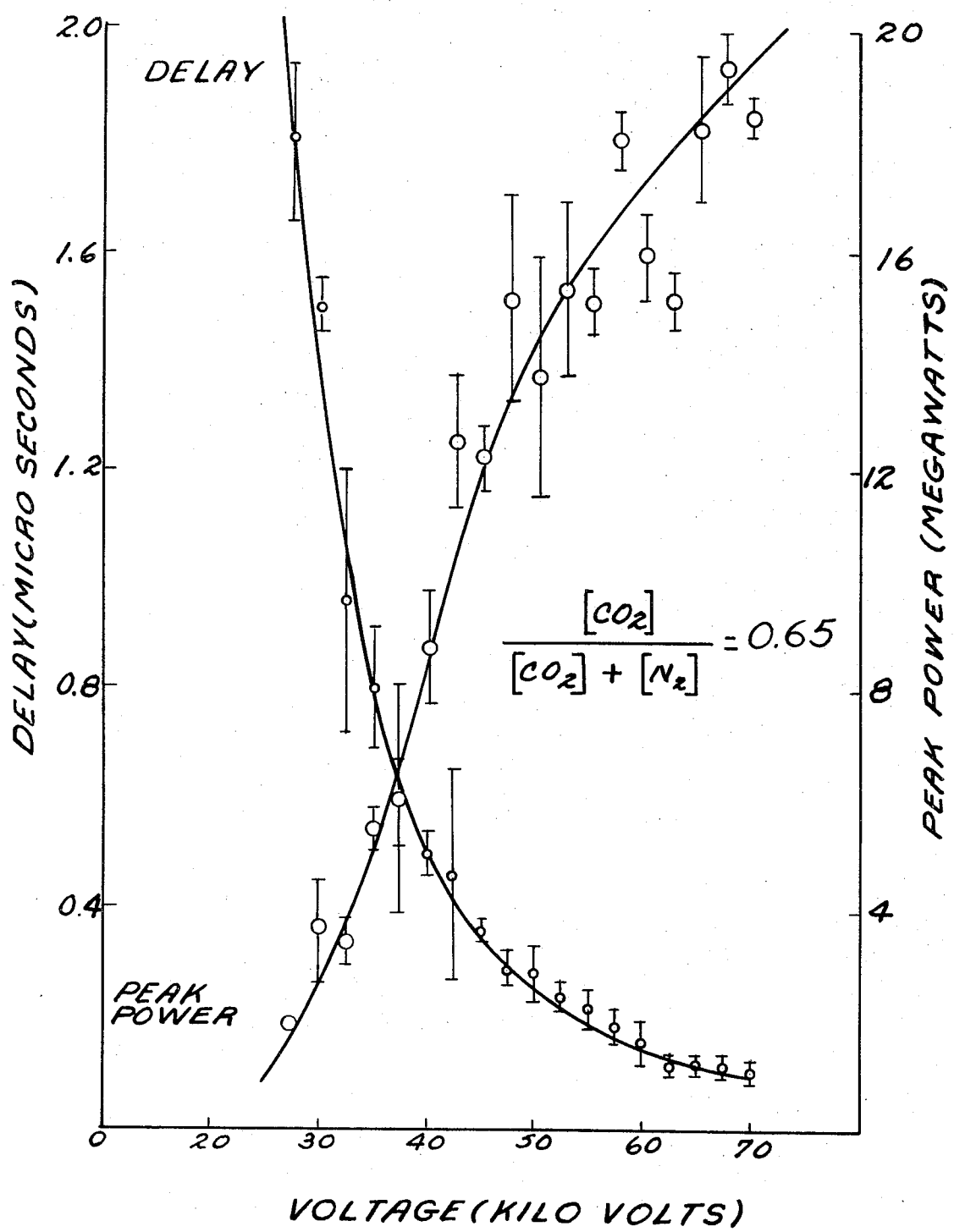
FIG. 5 shows a graph of typical peak power and delay versus voltage.

FIG. 5: radius of curvature mirror 18 gas flow 16.5 liters/min, reflectivity of window 20, 65 percent, percentages $CO_2$:$N_2$:He = 9.1:4.7:86.1 by vol.

Measurements of the energy of the laser output pulse have been made using uncoated NaCl, 65 and 85 percent reflectivity flat output windows together with 10 and 2.5 meter radii of curvature and flat totally reflecting mirrors. The typical voltage dependence observed is shown in FIG. 2. The energy increased and the frequency of bright arcs decreased as the voltage was increased. For a given gas mixture the energy increased linearly with voltage, rather than as the square of the voltage, indicating a decrease in efficiency with voltage. The frequency of bright arcs could be estimated by determining the number of dropouts, where a dropout was defined as an output less than 25 percent of the average output. From FIG. 2 it is evident that the number of dropouts fell drastically with voltage. Above 45 kV optimum output was achieved with a 65 percent reflecting output window and a 10 meter radius of curvature mirror.

As the voltage was raised it was possible to operate the laser with less helium without bright arcs occurring and pulses with greater energy were consequently obtained. At each voltage there was an optimum percentage of helium for maximum output energy. This maximum energy increased smoothly, but not linearly, with voltage (FIG. 3). The percentage of helium for maximum output decreased up to a voltage of 42 kV and then remained constant. This decrease in helium content was accompanied by an increase in efficiency up to a maximum of 15 percent at 42 kV. Above 42 kV the optimum mixture remained unchanged and the efficiency dropped. Energies in excess of 2 joules were achieved above 55 kV.

The output of the laser as a function of helium content is shown in FIG. 4. As the helium percentage was lowered the pulse energy increased, but the energy fluctuations also increased. The number of dropouts remained relatively constant at 10 percent until an unstable region, to the left of the vertical dash line of FIG. 4, was reached where the output energy fluctuated wildly and the number of dropouts exceeded 70 percent. No appreciable variation in output energy was observed over the operating range of total gas flow from 10 to 20 l/min.

The delay between the start of the initiating current pulse and the peak of the laser pulse decreased as the voltage was increased (FIG. 5). Above 45 kV it was impossible to determine the characteristics of the laser pulse using a CdHgTe detector because the delay was insufficient to separate the laser pulse from the enormous pickup induced by the current pulse. However, using a photon drag detector the pickup was reduced and it was thus possible to observe the laser pulse. The variation of peak output power with voltage is shown in FIG. 5. For a low dropout mixture of 68 percent He and about equal parts of $N_2$ and $CO_2$ the peak power was greater than 20 MW at 60 kV.

The nature of the shower discharges achieved with this TEA laser offers distinct advantages over spark discharges. Essentially a larger volume is excited per pin. Consequently, greater current per pin can be achieved without causing a bright arc; currents up to 10 A/pin have been obtained whereas with a resistor-loaded TEA laser currents above 4 A/pin result in a bright arc as reported by Fortin in Canadian Journal Physics, Vol.

49, pp. 257–264, January 15, 1971. In addition, less helium is required to sustain the discharge; instead of requiring greater than 90 percent helium as earlier reported by Fortin and Johnson in their above articles, less than 80 percent is required at 30 kV and less than 65 percent above 42 kV. The greater current per pin and the higher $CO_2$ concentration resulting from the lower helium concentration used both contribute to higher efficiencies than those achieved previously using similar gap spacings, see above Fortin and Johnson articles. Efficiencies greater than 11 percent have obtained throughout the voltage range, 30 to 60 kV. The maximum efficiency of 15 percent compares favourably with the 15–20 percent achieved with CW $CO_2$ lasers.

While the foregoing generally refers to a pin-rod type of electrode structure, use may be made of any of the other types of electrodes described in the commonly assigned Beaulieu et al. U.S. application Ser. No. 67074 filed Aug. 26, 1970, the content of which is incorporated hereinto by reference. When pin-pin or pin-blade electrodes are employed the value of capacitor 30 is reduced to 0.005 $\mu f$ maximum. Typical capacitance per unit length in any case is 50 pF/cm.

It should be noted that the present invention does not require wall effects of any sort either for cooling, confinement of gas discharge or to control other mechanism effecting population inversion.

As is well known, nitrogen is not essential to the gas mixture.

As is apparent from all the foregoing, high gas flow rates are not necessary for the operation of this invention; in fact the invention can operate under static gas filling conditions. Of course, the gas can be changed when contamination requires.

We claim:

1. A pulsed TEA laser comprising:
   an elongated cavity having a longitudinal optical axis,
   first and second spaced electrode means positioned on opposite sides of said optical axis, means for introducing gas into said cavity between said electrode means,
   said first electrode means including a multiplicity of spaced pin electrodes each of which are positioned to cooperate with said second electrode means,
   storage condenser means,
   means for charging said condenser means to a voltage of about 40 kilovolts,
   means connecting said condenser means across said electrode means including switch means directly connecting said condenser means to each of said pin electrodes for applying said condenser voltage across said first and second electrode means for up to only one half microsecond to cause uniform shower discharges from each of said pin electrodes to said second electrode means, said gas being a mixture including carbon dioxide and helium with helium being at least 62 percent and less than 80 percent of the mixture by volume.

2. A laser as in claim 1 wherein said voltage is of at least 45 kilovolts to secure very uniform shower discharges.

3. A laser as in claim 1 wherein the amount of said helium in said gas mixture is less than about 65 percent by volume.

4. A laser as in claim 1 wherein said cavity has an output window at one end for providing a laser output pulse as a result of said shower discharges, and wherein the voltage to which said condenser means is charged is sufficiently above 40 kilovolts to cause a reduction of at least about 50 percent, as compared to when the condenser means is charged to only 30 kilovolts, in the number of times the laser output pulse energy drops below 25 percent of the average output thereof, thereby causing a drastic reduction in the degeneration of said shower discharges to bright arcs and greatly increasing the uniformity of the shower discharges as compared to the results from only a 30 kilovolt charge of said condenser means.

5. A laser as in claim 1 wherein said voltage is in the range of from about 40 kilovolts to at least 60 kilovolts.

6. A laser as in claim 5 wherein said gas is a mixture including carbon dioxide and helium with helium being less than 70 percent by volume.

7. A method of operating pulsed TEA laser of the type including:
   an elongated cavity having a longitudinal optical axis,
   first and second spaced electrode means positioned on opposite sides of said optical axis,
   means for introducing gas into said cavity between said electrode means,
   said first electrode means including a multiplicity of spaced pin electrodes each of which are positioned to cooperate with said second electrode means,
   storage condenser means,
   means for charging said condenser means to a very high voltage,
   means connecting said condenser means across said electrode means including switch means directly connecting said condenser means to each of said pin electrodes;
   said method comprising the steps of:
   introducing into said cavity between said electrode means via said introducing means at substantially atmospheric pressure a gas mixture including at least carbon dioxide and helium with helium being in the range of from 62 percent to less than 80 percent by volume,
   charging said condenser means to at least about 40 kilovolts, and
   operating said switch means for applying the resulting condenser voltage directly across said first and second electrode means for up to only one-half microsecond to cause from each of said pin electrodes to said second electrode respective shower discharges that excite a larger volume of the gas mixture per pin and degenerate into bright arcs substantially less frequent than when the helium content of said mixture is outside said range.

8. A method as in claim 7 wherein said charging step causes the condenser means to be charged to a voltage in the range of about 40 kilovolts to at least 60 kilovolts.

9. A method as in claim 8 including flowing through said cavity via said gas introducing means a gas mixture including at least carbon dioxide and helium with helium being less than 70 percent by volume.

10. A method as in claim 7 wherein said charging step includes charging said condenser means to a said very high voltage that is sufficiently above 40 kilovolts to cause a significant reduction, as compared to when the condenser means is charged to only 30 kilovolts, in the number of times the laser output pulse energy drops below 25 percent of the average output thereof, thereby causing a drastic reduction in the degeneration of said shower discharges to bright arcs and greatly increasing the excited volume of gas per pin and the uniformity of the shower discharges over the results from only a 30 kilovolt charge of said condenser means.

11. A method as in claim 10 wherein said significant reduction is at least about 50 percent.

* * * * *